(12) United States Patent
Keating et al.

(10) Patent No.: US 10,302,834 B2
(45) Date of Patent: May 28, 2019

(54) APPARATUS AND METHODS FOR LIGHTING A FLOOR USING A LIGHT DIFFUSING FIBER

(71) Applicant: Versalume LLC, Santa Clara, CA (US)

(72) Inventors: Kerry Keating, San Jose, CA (US); Mario Paniccia, Santa Clara, CA (US)

(73) Assignee: VERSALUME LLC, Santa Clara, CA (US)

( * ) Notice: Subject to any disclaimer, the term of this patent is extended or adjusted under 35 U.S.C. 154(b) by 153 days.

(21) Appl. No.: 15/474,097

(22) Filed: Mar. 30, 2017

(65) Prior Publication Data
US 2018/0284334 A1   Oct. 4, 2018

(51) Int. Cl.
| | |
|---|---|
| F21V 7/22 | (2018.01) |
| F21V 8/00 | (2006.01) |
| G02B 6/02 | (2006.01) |
| A63C 19/00 | (2006.01) |
| E04F 15/02 | (2006.01) |
| G02B 6/036 | (2006.01) |
| F21W 111/00 | (2006.01) |
| F21Y 115/30 | (2016.01) |

(52) U.S. Cl.
CPC .............. *G02B 6/001* (2013.01); *E04F 15/02* (2013.01); *F21V 7/22* (2013.01); *A63C 19/00* (2013.01); *A63C 2203/14* (2013.01); *E04F 2290/026* (2013.01); *F21W 2111/00* (2013.01); *F21Y 2115/30* (2016.08); *G02B 6/0229* (2013.01); *G02B 6/02395* (2013.01); *G02B 6/036* (2013.01)

(58) Field of Classification Search
CPC .. G02B 6/001; A63C 2203/14; E04F 2290/26
See application file for complete search history.

(56) References Cited

U.S. PATENT DOCUMENTS

| | | | |
|---|---|---|---|
| 4,340,929 A | 7/1982 | Konikoff et al. | |
| 4,907,361 A * | 3/1990 | Villard ................... | G09F 19/22 362/153 |

(Continued)

OTHER PUBLICATIONS

Daktronics Inc., BB-2135 Backboard LED Light Strips, Display Manual, ED-14187, Product 1237, Rev Mar. 8-15, 2016, pp. 1-37.

(Continued)

*Primary Examiner* — William N Harris
(74) *Attorney, Agent, or Firm* — Edell, Shapiro & Finnan, LLC

(57) ABSTRACT

According to some implementations a floor is provided that comprises a substrate having a top surface and a groove formed therein. The groove has an open end located at the top surface of the substrate. The groove further includes a bottom wall and side walls with the bottom wall located a first distance below the top surface of the substrate. The groove extends along a length of the substrate. A light diffusing optical fiber or other lighting means is supported inside the groove by a transparent or translucent fiber support that spaces the light diffusing optical fiber or other lighting means a distance away from the bottom wall, side walls and open end of the groove. According to some implementations the walls of the groove or the outer surfaces of the fiber support are provided with light reflectors to enhance the propagation of light toward the open end of the groove.

20 Claims, 18 Drawing Sheets

FIG.2

(56) References Cited

U.S. PATENT DOCUMENTS

| | | | |
|---|---|---|---|
| 5,305,998 | A | 4/1994 | Nesbit et al. |
| 5,649,043 | A | 7/1997 | Adams et al. |
| 7,021,786 | B1 | 4/2006 | Sandor, Sr. |
| 7,119,704 | B2 | 10/2006 | Grzan et al. |
| 7,549,784 | B1 | 6/2009 | Teeters |
| 7,670,022 | B2 | 3/2010 | Kessler et al. |
| 7,688,222 | B2 * | 3/2010 | Peddie ............ G08G 1/096783 116/63 P |
| 8,545,076 | B2 | 10/2013 | Bickham et al. |
| 9,192,849 | B2 | 11/2015 | Suhr |
| RE46,098 | E | 8/2016 | Bickham et al. |
| 2002/0159275 | A1 * | 10/2002 | Nicholls ................ A63C 19/02 362/559 |
| 2003/0021572 | A1 | 1/2003 | Steinberg |
| 2007/0053201 | A1 | 3/2007 | Dietz et al. |
| 2007/0263380 | A1 | 11/2007 | Hamar et al. |
| 2009/0010602 | A1 | 1/2009 | Nothofer et al. |
| 2009/0086503 | A1 * | 4/2009 | Trujillo ................ G02B 6/001 362/605 |
| 2009/0197710 | A1 | 8/2009 | Ronda |
| 2009/0310347 | A1 | 12/2009 | Lath |
| 2010/0298075 | A1 | 11/2010 | Paslay et al. |
| 2011/0310595 | A1 | 12/2011 | Hardesty |

OTHER PUBLICATIONS

International Search Report and Written Opinion of the International Searching Authority in corresponding International Application No. PCT/US18/25415, dated Jun. 25, 2018.

* cited by examiner

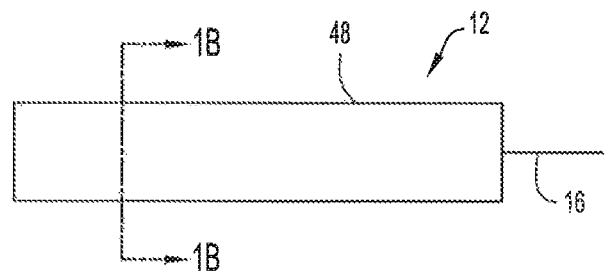
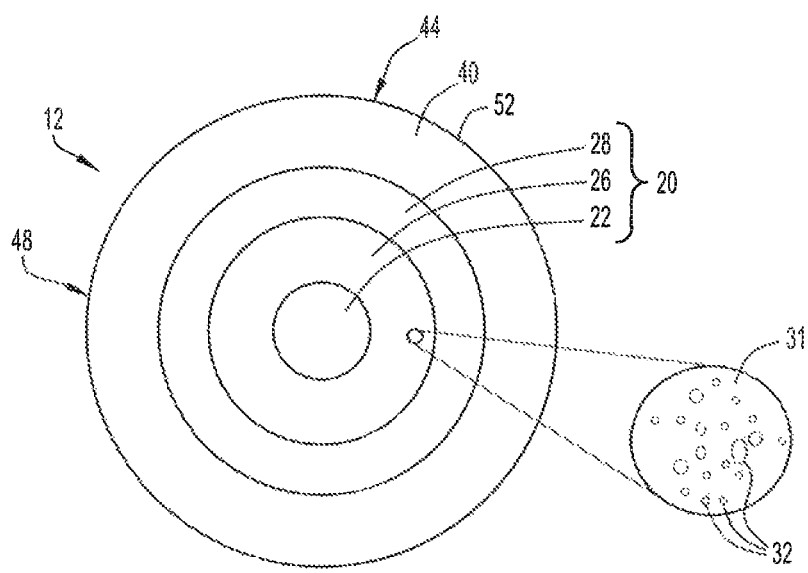
FIG.1A
FIG.1B

APPARATUS AND METHODS FOR LIGHTING A FLOOR USING A LIGHT DIFFUSING FIBER

TECHNICAL FIELD

The present disclosure relates to apparatus and methods for lighting a floor.

SUMMARY OF THE DISCLOSURE

According to some implementations a floor is provided that comprises a substrate having a top surface and a groove formed therein. The groove has an open end located at the top surface of the substrate. The groove further includes a bottom wall and side walls with the bottom wall located a first distance below the top surface of the substrate. The groove extends along a length of the substrate and a light diffusing optical fiber or other lighting means is supported inside the groove by a transparent or translucent fiber support that spaces the light diffusing optical fiber or other lighting means a distance away from the bottom wall, side walls and open end of the groove. According to some implementations the walls of the groove or the outer surfaces of the fiber support are provided with light reflectors to enhance the propagation of light emitted by the light diffusing optical fiber or other lighting means toward the open end of the groove.

BRIEF DESCRIPTION OF THE DRAWINGS

FIGS. 1A and 1B respectively show a side view and cross-section view of a light diffusing optical fiber according to one implementation;

DETAILED DESCRIPTION

Figure 2:
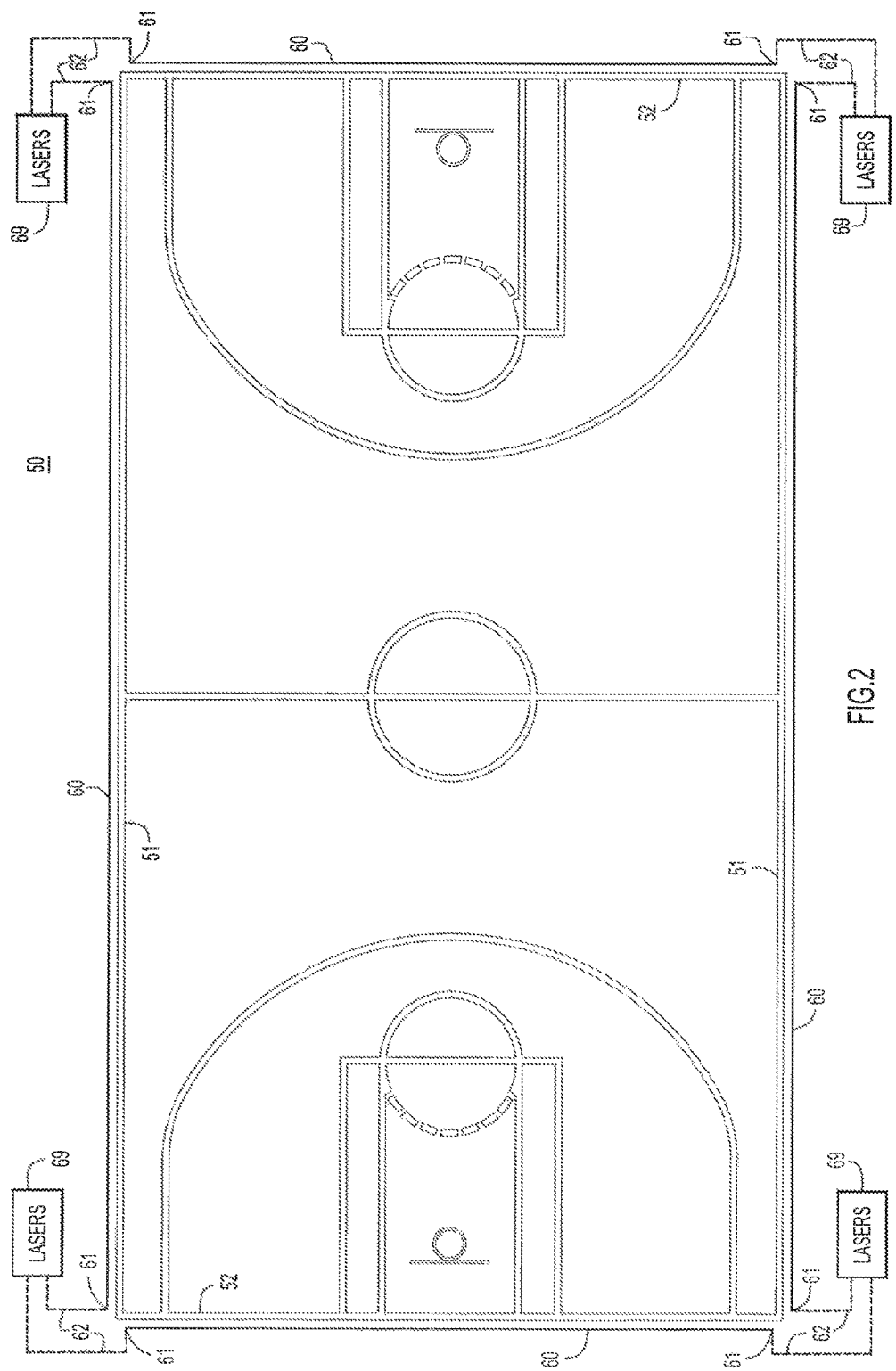
FIG. 2 illustrates light diffusing optical fibers disposed within the floor located adjacent the periphery of a basketball court.

FIG. 1A is a schematic side view of a section of an example of a light diffusing fiber with a plurality of voids in the core of the light diffusing optical fiber 12 having a central axis 16. FIG. 1B is a schematic cross-section of a light diffusing optical fiber 12 as viewed along the direction 1B-1B in FIG. 1A. Light diffusing fiber 12 can be, for example, an optical fiber with a nano-structured fiber region having periodic or non-periodic nano-sized structures 32 (for example voids). In an example implementation, fiber 12 includes a core 20 divided into three sections or regions. These core regions are: a solid central portion 22, a nano-structured ring portion (inner annular core region) 26, and outer, solid portion 28 surrounding the inner annular core region 26. A cladding region 40 surrounds the annular core 20 and has an outer surface. The cladding 40 may have low refractive index to provide a high numerical aperture. The cladding 40 can be, for example, a low index polymer such as UV or thermally curable fluoroacrylate or silicone.

An optional coating 44 surrounds the cladding 40. Coating 44 may include a low modulus primary coating layer and a high modulus secondary coating layer. In at least some implementations, coating layer 44 comprises a polymer coating such as an acrylate-based or silicone based polymer. In at least some implementations, the coating has a constant diameter along the length of the fiber.

In other exemplary embodiments described below, coating 44 is designed to enhance the distribution and/or the nature of radiated light that passes from core 20 through cladding 40. The outer surface of the cladding 40 or the of the outer of optional coating 44 represents the sides 48 of fiber 12 through which light traveling in the fiber is made to exit via scattering, as described herein.

A protective jacket (not shown) optionally covers the cladding 40.

In some implementations, the core region 26 of light diffusing fiber 12 comprises a glass matrix 31 with a plurality of non-periodically disposed nano-sized structures (e.g., voids) 32 situated therein, such as the example voids shown in detail in the magnified inset of FIG. 1B. In another example implementation, voids 32 may be periodically disposed, such as in a photonic crystal optical fiber, wherein the voids may have diameters between about $1\times10^{-6}$ m and $1\times10^{-5}$ m. Voids 32 may also be non-periodically or randomly disposed. In some exemplary implementations, glass 31 in region 26 is fluorine-doped silica, while in other implementations the glass may be an undoped pure silica.

The nano-sized structures 32 scatter the light away from the core 20 and toward the outer surface of the fiber. The scattered light is then diffused through the outer surface of the fiber 12 to provide the desired illumination. That is, most of the light is diffused (via scattering) through the sides of the fiber 12, along the fiber length.

According to some implementations the core 20 has a diameter in the range of 125-300 µm and the overall diameter of the fiber system, including the protective jacket, is in the range of 0.7 to 1.2 mm.

A detailed description of exemplary light diffusing optical fibers may be found in Reissue Pat. No. RE46,098 whose content is incorporated herein by reference in its entirety.

FIG. 2 shows a basketball court 50 having light diffusing optical fibers 60 incorporated into the court flooring in areas just outside the sidelines 51 and end lines 52. Examples of how the light diffusing optical fiber may be incorporated into the flooring will be explained in detail below. The fiber 60 is installed below the top surface of the flooring so that light emitted by the fiber is visible from the top surface. In the example of FIG. 2 there are provided four fibers 60, one for each of the side lines 51 and end lines 52. It is appreciated that more or fewer fibers may be used. For example, more fibers of a shorter length may be used. By shortening the length of the fibers the illumination intensity produced by the fibers can be increased.

In the implementation of FIG. 2 each end 61 of the fiber 60 is light coupled to a laser source 69 so that light is delivered to the fibers from both ends. According to other implementations only one end of the fiber is connected to a laser source. The coupling of both ends of the fiber 60 to a light source assist in providing a more uniform and more intense illumination along the length of the fiber. The laser source 69 may be a multimode or a single mode laser diode. According to some implementations the laser source 69 is configured to emit light visible to the human eye, while in other implementations is configured to emit light that is not visible to the human eye, such as for example, infrared light. According to some implementations the laser source may be capable of emitting a single color of light. According to other implementations the laser source is capable of emitting multiple colors of light with, for example, the use of a RGB laser module.

The laser source 69 may be located near or far from the light diffusing optical fiber 60. In any event, transport optical fibers (non-radially emitting) 62 may be used to couple the laser source 69 to the light diffusing fiber 60 to optimize the delivery of light to the end(s) of the light diffusing fiber with little loss.

In the basketball court example of FIG. 2 the lighting provided by the light diffusing optical fibers may be used for aesthetic or entertaining purposes or may be used to assist in the regulation of the game. For entertainment purposes the fibers may be illuminated each time a goal is made. In such an event the fibers may emit a light that is only visible to cameras that provide a video feed to home viewers in order to prevent a distraction to the players.

To assist in the regulation of a basketball game the fibers 60 may be illuminated each time the shot clock expires. Once a team gains control of the basketball, that team has 24 seconds to put up a legal shot. A legal shot is defined as a shot that is successful, or if unsuccessful, hits the ring. That shot has to be in the air (left the shooters hand), before 24 seconds has elapsed. So if the clock sounds after the shot is in the air, and that shot is successful, or hits the ring, that is not a violation. The shot clock starts when a team gains procession of the ball, and can reset when procession changes, a violation occurs, a foul occurs, a jump ball, or a legal shot hits the ring.

Currently a referee determines if the shot clock has expired by keeping an eye on the backboard that has a light arranged about its perimeter that illuminates yellow when the shot clock expires. Referees can make mistakes by having to keep an eye on both the backboard and the hands of the player possessing the ball during the shot clock countdown. This problem can be obviated by illuminating one or more of the fibers 60 disposed about at least a portion of the periphery of the basketball court 50. That is, when the shot clock expires, one or more of the fibers 60 may illuminate yellow or some other color in conjunction with the illumination of the backboard. Because of their peripheral location about the court, the fibers 60 are almost constantly in the line of sight of the referees regardless of their position on the court and regardless the position of the player that possesses the ball. For this reason the referees can more easily determine if the ball has left the hands of a player when the shot clock expires, leading to fewer errors. This is particularly true for the referee that is generally positioned behind the end line of the court.

In the NBA games are played in four 12 minute quarters. College men's games use two 20 minute halves, college women's games use 10 minute quarters, and United States high school varsity games use 8 minute quarters. A game clock is used to monitor the time and upon the end of each quarter or half causes another light on the backboard to illuminate red. A basket made by a shot that leaves a player's hand before the game clock expires is considered successful even if the game clock expires while the ball is in the air. Like the shot clock described above, currently a referee determines if the game clock has expired by keeping an eye on the backboard. Referees can easily make mistakes by having to keep an eye on both the backboard and the hands of the player possessing the ball during the game clock countdown. This problem can be obviated by illuminating one or more of the fibers 60 disposed about at least a portion of the periphery of the basketball court 50. That is, when the game clock expires, one or more of the fibers 60 may illuminate red or some other color in conjunction with the illumination of the backboard.

With reference to FIGS. 1 and 2, according to some implementations the laser sources 69 include a control circuit that is configured to cause a laser to illuminate one or more of the fibers 60 upon the control circuit receiving a signal indicative of the shot clock and/or game clock expiring. According to one implementation the signal is received in the control circuit of the laser sources 69 directly from the shot clock and game clock, whereas in another implementation the signal is received in the control circuit of the laser sources 69 from a controller that is operatively coupled to the shot clock and game clock. According to some implementations the laser sources 69 contain one or more RGB lasers that are capable of producing in the fibers 60 a host of different light colors, including both red and yellow light.

Figure 3:
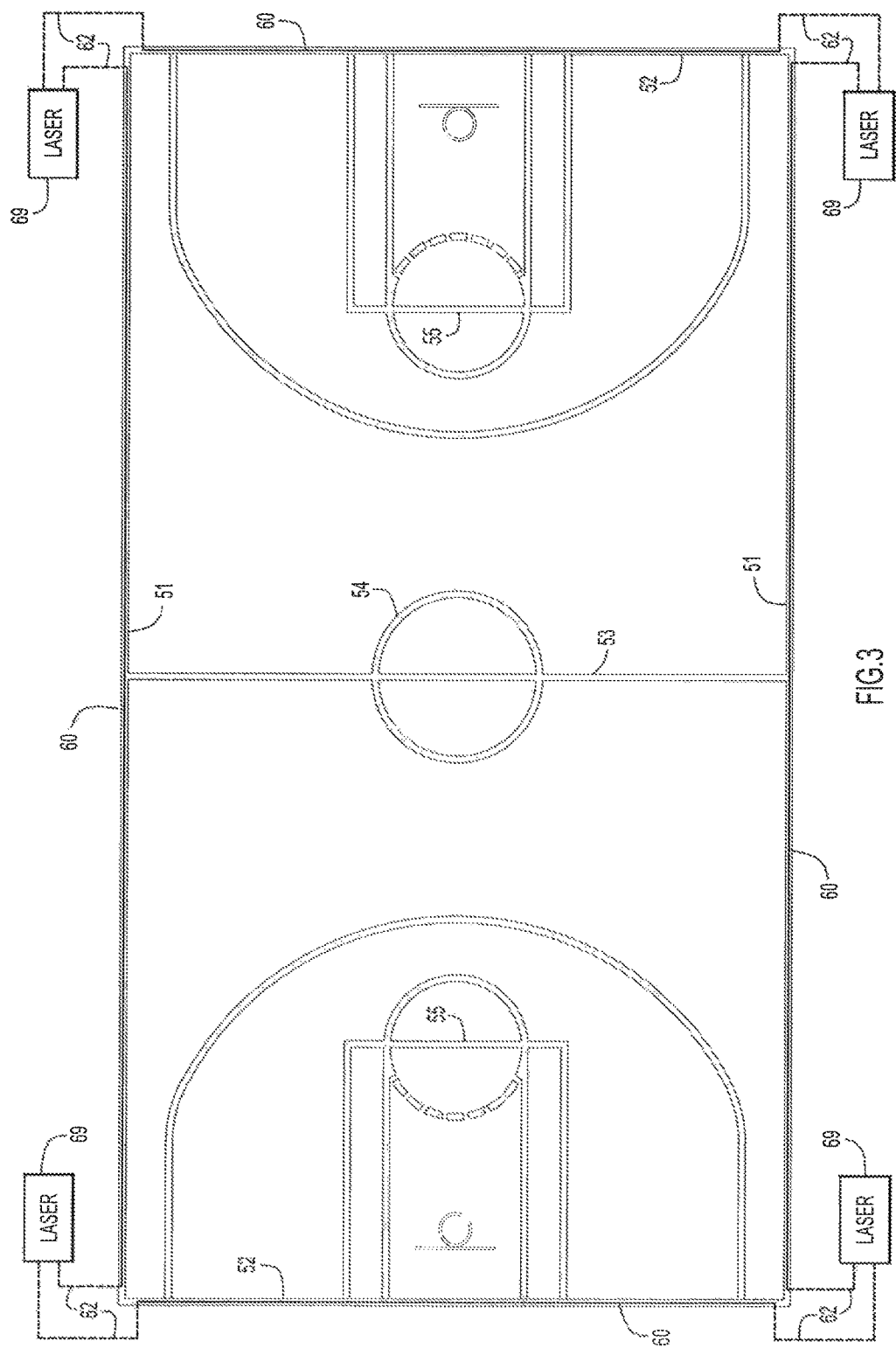
FIG. 3 illustrates light diffusing optical fibers disposed within the floor at the periphery of a basketball court.

It is important to note that the fibers 60 may be situated in any of a variety of locations on or off the play court. For example, as shown in FIG. 3, the fibers may be located within the side lines 51 and end lines 52 of the court. The fibers 60 may also be provided to illuminate the half-court centerline 53, the center circle 54, the free shot line 55, etc. Some or all of the lines of a basketball court 50 may be substituted with one or more fibers 60 so that taping or paining of the court is minimized or not required.

Due to the flexibility of the light diffusing fiber 60, it can be manipulated to assume a variety of shapes and may therefore be implanted in a floor to display any of a variety of shapes for use in producing lettering, illustrations and the like. For example, the fibers may be arranged inside an athletic court flooring to display a team mascot and/or slogan.

Figure 4:
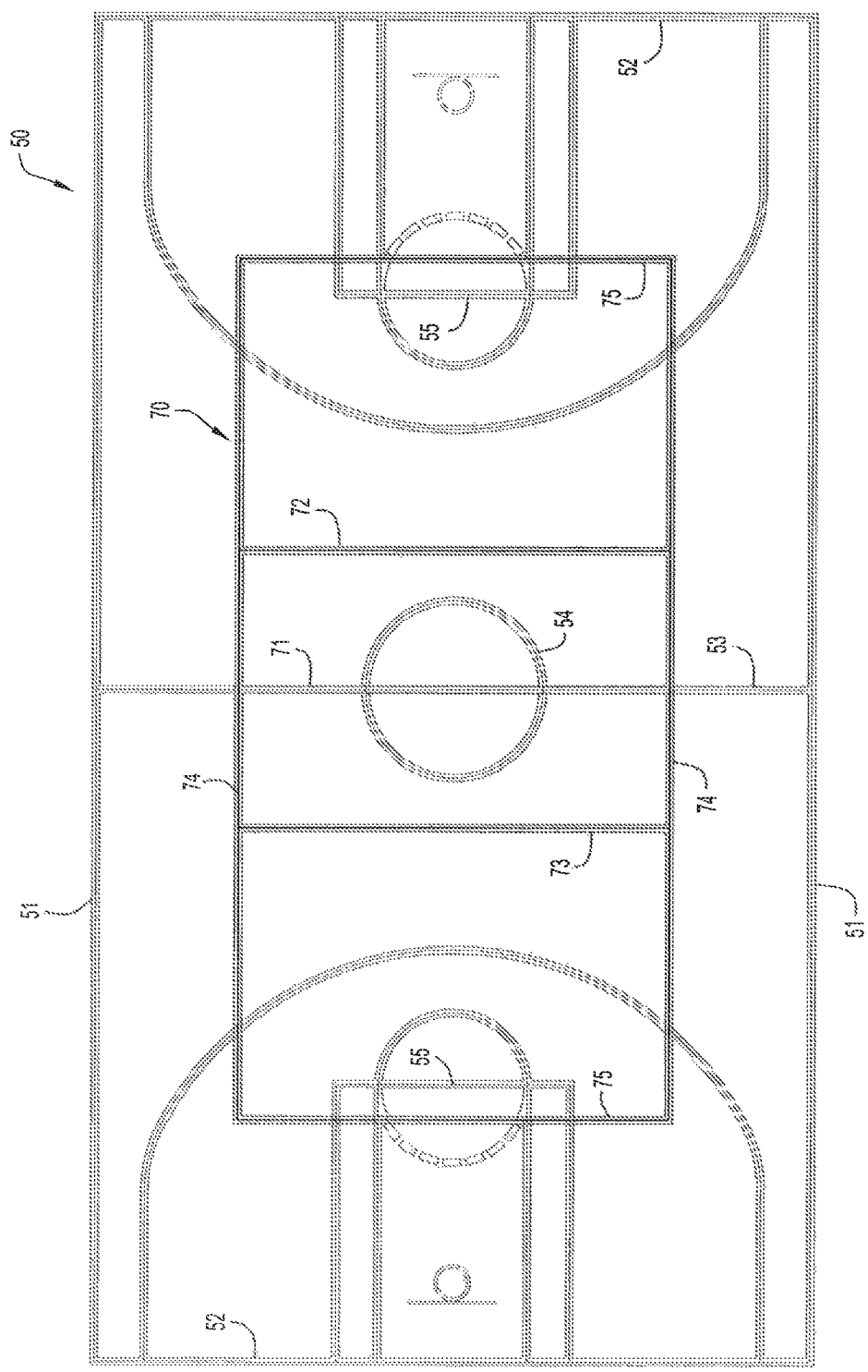
FIG. 4 illustrates light diffusing optical fibers laid out within a floor to interchangeably define a basketball court and a volleyball court.

As discussed above, according to some implementations light diffusing optical fibers can be used to partially or fully replace the taped or painted lines that define an athletic court such as a basketball court, volleyball court, badminton court, indoor soccer court, handball court, etc. According to one implementation as shown in FIG. 4, the light diffusing optical fibers 60 may be used to delineate in a common flooring both a basketball court 50 and a volleyball court 70. When it is desired to provide only an illuminated profile or partial profile of the volleyball court 70, light may be delivered to the center line 71, attack lines 72 and 73, sidelines 74 and back lines 75 with no light being delivered to the optical fibers associated with the basketball court 50 except those lines that are common to both the volleyball court and basketball court. Conversely, when it is desired to provide only an illuminated profile or partial profile of the basketball court 50, light may be delivered to the side lines 51, end lines 52, centerline 53, center circle 54, free throw line 55, etc. with no light being delivered to the optical fibers associated with the volleyball court 70 except those lines that are common to both the basketball court and volleyball court. The optical fibers may be embedded within the flooring in a manner that minimizes their visual impact when they are not illuminated so that the lines delineated by the unilluminated optical fibers do not provide a distraction to the players.

Although not shown in FIG. 4, laser sources 69 and transport optical fibers 62 like those described above may be used to deliver light to the light diffusing fibers 60.

Although the foregoing and following discussion is primarily directed to athletic flooring, it is appreciated that the apparatus and methods disclosed herein are applicable to a wide variety of non-athletic flooring types. In a non-limiting manner, these flooring types may be associated with domestic, public and industrial use.

Using light diffusing optical fibers to illuminate a floor provides several advantages over traditional lighting solutions such as incandescent bulbs, fluorescent bulbs and light-emitting diodes (LEDs). Each of these traditional lighting solutions produce a moderate to a significant amount of heat that over time can lead to a degradation of the flooring in which they are implanted. This is particularly true for wood flooring applications. Incandescent and fluorescent bulbs are rigid structures that are easily breakable. Although a string of LEDs may assume a curved configuration to illuminate, for example, the center circle of a basketball court, the light produced along the length of the LED string is not uniform. That is, the gap between each of the LEDs is readily recognizable when the LEDs are illuminated. LEDs are also directional light sources that emit light in a specific direction. Light diffusing optical fibers, on the other hand, generate essentially no heat, are flexible and can emit substantially uniform and omnidirectional radiation over its length. Light diffusing optical fibers also have a much smaller cross-sectional profile that permit them to be implanted in a floor without significantly disrupting the structural integrity of the floor. In addition, because light diffusing optical fibers can emit omnidirectional light they are particularly compatible with the use of reflectors that can be used to produce a desired illumination profile at the surface of the flooring in which they are embedded. For example, reflectors may be deployed at least partially around the light diffusing optical fiber to produce a desired illumination width at the surface of the floor. Moreover, light diffusing optical fibers have a long length capability with lengths of up to 50 meters or more.

FIG. 5A through 5F illustrate a variety of examples for implanting a light diffusing fiber 60 into a rectangular groove formed within a floor 80 or other type of substrate. A fiber support 90 that is transparent or translucent to the light emitted by the fiber 60 is located in the groove of the substrate 80 and is configured to hold the fiber a spaced distance from the bottom wall 91 and sidewalls 92 of the groove. The fiber support 90 has an aperture 93 that runs along a length or the entire length of the support. In the implementations of FIGS. 5A through 5F the aperture has a greater cross-section or diameter than the cross-section or diameter of the fiber 60. This allows the fiber 60 to be readily introduced or withdrawn from the fiber support 90. The fiber 60 can therefore be removed from the support and replaced with a new or different fiber if the fiber breaks or when an updated or improved fiber becomes commercially available. To facilitate the insertion and removal of the fiber 60 one or both of the outer-most surface of the fiber 60 and/or inner surface of the aperture 93 may possess a lubricous coating that is at least partially transparent to the light emitted by the fiber.

As discussed above, the light diffusing optical fiber may comprise a glass core. The glass core is susceptible to breaking when stressed. By making the diameter of the aperture 93 greater than the diameter of the outer-most surface of the fiber 60, the fiber support 90 can sustain a greater degree of deformation without harming the fiber 60 as compared to a fiber support having an aperture that has substantially the same cross-section as the fiber 60. According to some implementations the cross-sectional area of the aperture 93 is between 5 to 25 percent greater than the cross-sectional area of the fiber 60.

Indoor athletic flooring, such as an indoor basketball court, is typically provided with a thin durable coating 85, such as a urethane or epoxy, to protect the floor from scratching and to provide a requisite amount of slip resistance. For indoor basketball courts, the wood flooring is periodically refinished over its estimated 20 year life. The refinishing includes the removal of the surface coating 85 and a subsequent sanding of the top surface of the floor. The depth "d" of the groove in the floor will thus decrease over time. For this reason, in the implementations of FIGS. 5A and 5B, where the fiber support 90 occupies all or substantially all of the groove, the fiber support 90 may be made of a material that may be removed (e.g. sanded, ground, scraped, etc.) to the same degree as the top surface of the floor 80 during the refinishing process. This way, the top surface 94 of the fiber support 90 can be maintained planar with the top surface 86 of the floor. When the removal process is complete the top coating 85 may be reapplied to cover the top surfaces 86 and 94 of the respective floor substrate 80 and fiber support 90. As noted above, the coating 85 may be a urethane (e.g. polyurethane), an epoxy or any other coating that is translucent or transparent to the light emitted by the fiber 60. According to some implementations the fiber support 90 and coating 85 are made of the same or substantially same material The depth "d" and width "w" of the groove and fiber support 90 will vary depending on the desired illumination profile to be presented at the top surface 88 of the coating 85. According to some implementations the depth of the groove is between about 0.2 to 0.5 inches and the width of the groove is between about 0.2 to 2.0 inches.

According to some implementations the fiber support 90 has a hardness that is sufficient to prevent the top surface 94 from collapsing or otherwise significantly deforming when a force is applied to its top surface 94 during an athletic event. According to some implementations the fiber support 90 is flexible along its length sufficient for it to assume a curved or circle shape. According to some implementations the light diffusing optical fiber can be bent to have a radius of curvature of between 5 to 10 millimeters. This type of flexibility is not achievable with convention light sources. According to some implementations the fiber support 90 has a thermal expansion coefficient of between ±20 percent of that of the floor substrate 80.

In the example fiber supports depicted in each of FIGS. 5A-17 the fiber 60 is shown situated in an aperture 93 that runs at least along a length of the support with the diameter or cross-section of the aperture 93 is greater than the diameter or cross-section of the fiber 60. According to other implementations the fiber 60 is embedded in the fiber support 90 so that the outer surface of the fiber jacket is flush with the inner surface of the aperture.

Figure 5A:
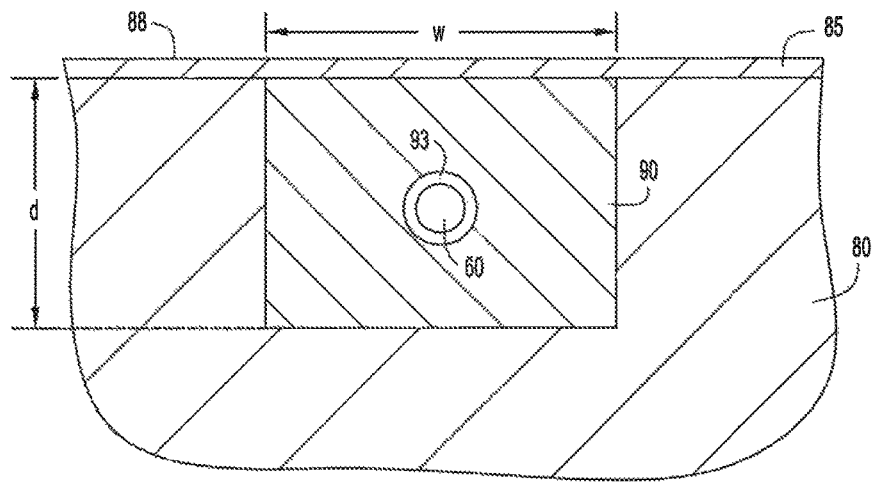
FIGS. 5A-F illustrates a cross-section view of one or more light diffusing optical fibers disposed in a floor according to some implementation.
Figure 5B:
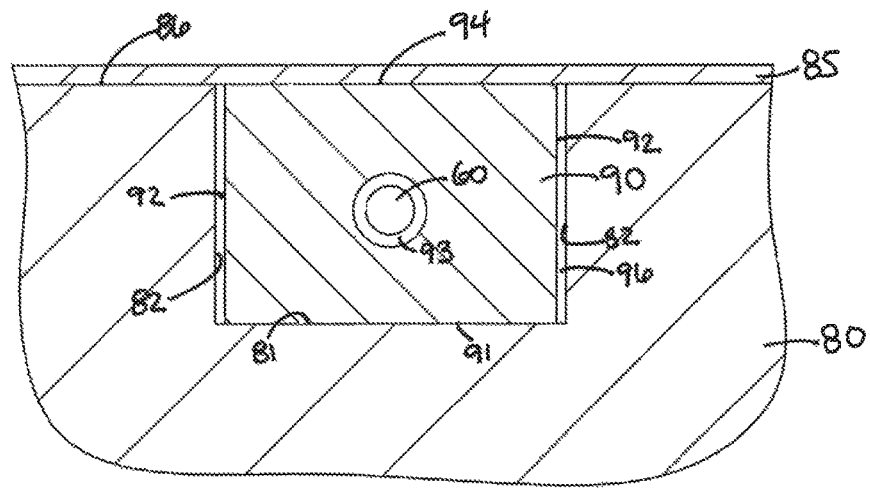

In the implementation of FIG. 5B the fiber support 90 has a width that is less than the width of the groove so that a gap 96 exists between the sidewalls 82 of the fiber support and the sidewalls 92 of the groove. This provides several advantages. First, it permits the groove to be formed with greater tolerances which reduces costs. Second, the gap 96 accommodates a greater thermal expansion mismatch between the material forming the floor substrate 80 and the material forming the fiber support 90 so that the floor substrate 80 and fiber support 90 are able to expand and contract to a greater degree without adversely interfering with one another.

Figure 5C:
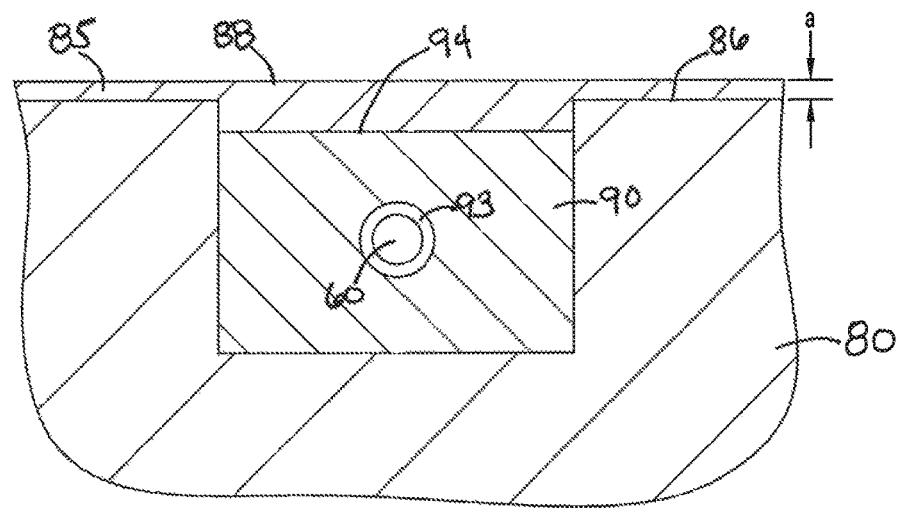

The implementation of FIG. 5C is similar to the implementation of FIG. 5A with the exception that the height dimension of the fiber support 90 is less than the depth dimension "d" of the groove formed in the floor substrate 80. As a result of this difference there exists a gap between the top surface 94 of the fiber support 90 and the top surface 86 of the floor substrate 80. According to some implementations, as shown in FIG. 5C, this gap is filled with the same material as the floor top coat 85. An advantage of this design is the floor can be refinished in a manner similar to that disclosed above without the need to remove any material from the fiber support 90. Accordingly, a sanding or other removal process may be employed to expose the top surface 86 of the floor substrate 80 so that it can be sanded. During this process at least a portion of the top coat 85 residing above the top surface 94 of the fiber support 90 remains in place during the refinishing process. Thus, when the sanding/removal process is complete, a layer of the top coat material may be applied evenly over the entire surface of the floor to complete the refinishing process.

As discussed above, basketball courts are generally refinished a number of times over the life of the court. According to some implementations the depth "a" of the gap is sufficient to obviate the need to remove any portion of the fiber support 90 during the life of the court. According to some implementations the gap depth "a" is between 0.2 to 0.5 inches.

Figure 5D:
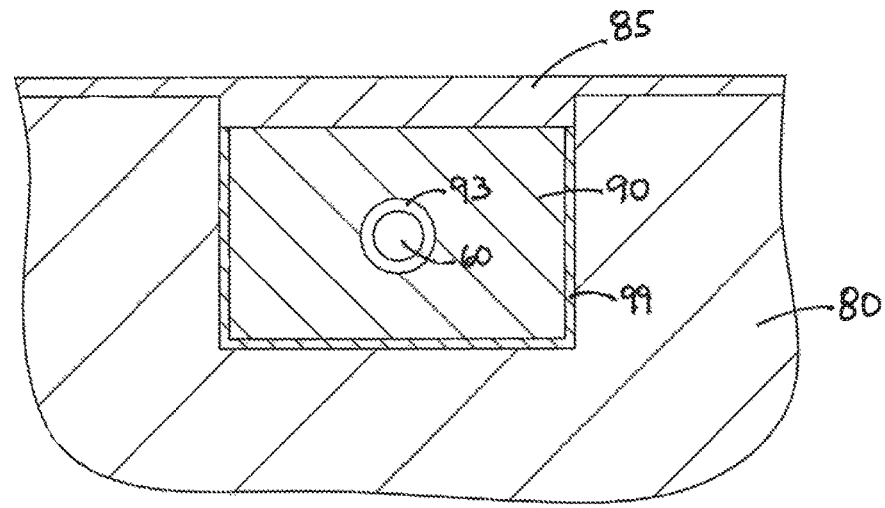

In the implementation of FIG. 5D a reflector 99 that surrounds at least a portion of the fiber 60 is provided. As explained above, according to some implementations the fiber 60 emits light from all sides of the fiber. In order to scatter light emitted from the bottom and side surfaces of the fiber 60 toward the top surface 88 of the floor coating 85, one or more of the bottom surface 81 and side surfaces 82 of the groove may be coated with a light reflective coating, such as, for example, a light reflective paint. In lieu of coating the sides of the groove with a light reflective coating, one or more of the bottom and side surfaces 91 and 92 of the fiber support 90 may be coated with the light reflective coating. The reflector 99 may also comprise one or more substrates that are capable of reflecting light emitted by the fiber. The one or more substrates may be affixed to one or more of the inside surfaces 81, 82 of the groove or one or more of the outer surfaces 91, 92 of the fiber support 90. The one or more substrates may comprise mirrors, polished metallic panels, or any other structure capable of reflecting light emitted by the fiber 60.

Figure 5E:
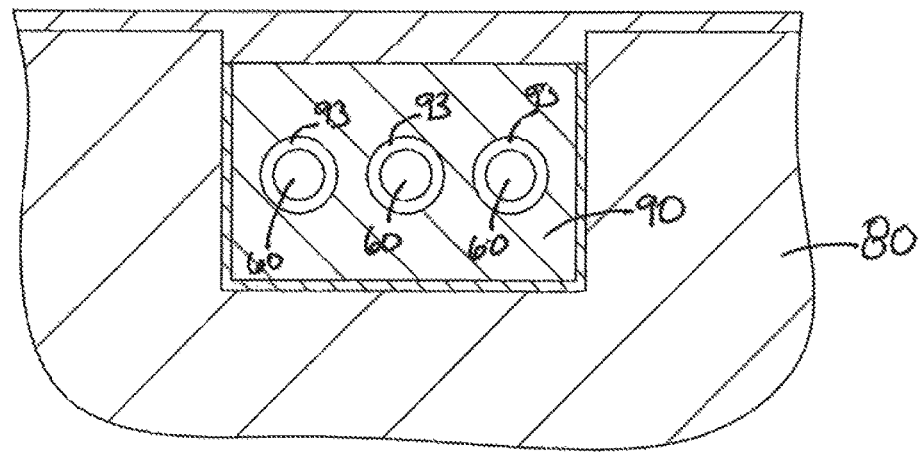
Figure 5F:
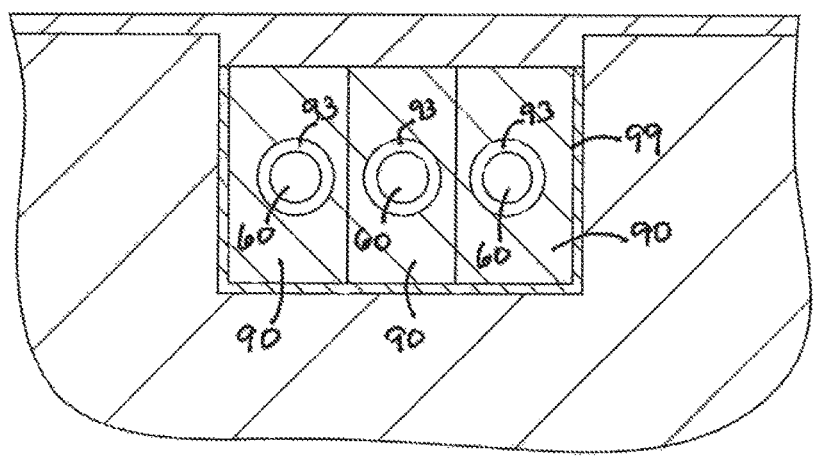

In regard to each of the configurations disclosed and contemplated herein, the groove of a substrate 80 may possess more than one fiber 60. FIG. 5E illustrates an example with there being three fibers 60 positioned inside the groove of the substrate 80, the fibers being supported inside the groove by a fiber support 90 that possesses three elongate apertures 93 that house the fibers. In lieu of the multiple fibers 60 being located in a common fiber support 90 as shown in FIG. 5E, each fiber may reside in its own fiber support as illustrated in FIG. 5F.

The fiber support 60 may comprise any of a number of cross-section shapes other than a rectangular shape, such as, for example, triangular-like, parabolic-like and semicircular shapes that may facilitate the scattering of light emitted by the fiber(s) toward the top surface 88 of the top coat 85 of the substrate 80 in a more efficient manner. FIGS. 6A, 6B, and 15-17 illustrate fiber supports having a triangular-like shape. FIGS. 8-14 illustrate fiber supports having a parabolic-like shape. As will be explained below, the parabolic shaped fiber supports may be substituted with semicircular shaped fiber supports.

Figure 6A:
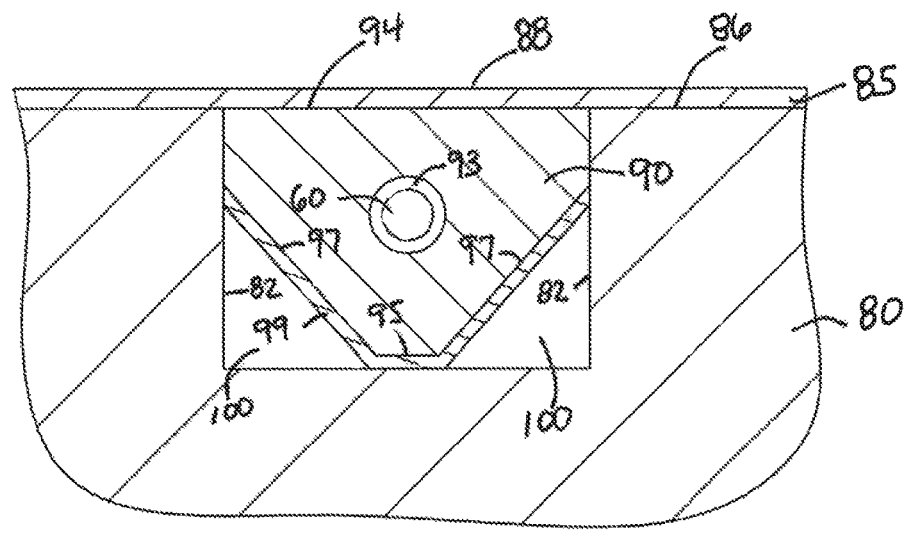
FIGS. 6A, 6B, 7 and 8 illustrate cross-section views of light diffusing optical fibers disposed in a floor according to other implementations.

In the implementation of FIG. 6A a triangular-like shaped fiber support 90 is provided with an aperture 93 that runs at least a portion of the length or the entire length of the support. The fiber 60 may be supported inside the aperture 93 in a removable or fixed fashion like that discussed above. FIG. 6A shows the fiber as being removable by virtue of it having a smaller cross-sectional area/diameter than that of the aperture 93. Like the implementations of FIGS. 5A and 5B, the top surface 94 of the fiber support resides in the same or substantially same plane as that of the top surface 86 of the substrate 80. The fiber support includes a base 95 from which two side surfaces 97 extend upward in a diagonal fashion. According to some implementations the base 95 and side surfaces 97 include a reflector 99 that is configured to reflect light emitted from the bottom and side surfaces of the fiber 60 upward toward the top surface 88 of the top coat 95 that is applied to the top surface 86 of the substrate 80. The reflector 99 may comprise a light reflective paint, another type of light reflective coating or a reflective substrate like those described above.

With continued reference to FIG. 6A, there is a space 100 located between the reflector 99 and the sidewalls 82 of the groove. According to some implementations the space 100 is devoid of any structure. According to some implementation the diagonally disposed side walls 97 of the fiber support 90 are capable of flexing outward into the space 100 when the fiber support is subjected to stress. This ability to flex can assist in preventing the formation of cracks in the fiber support 90 when the support is physically stressed, for example, by pressure being applied to its top surface 94 or by a thermal expansion or contraction of one or more of the substrate 80 and support 90.

Figure 6B:
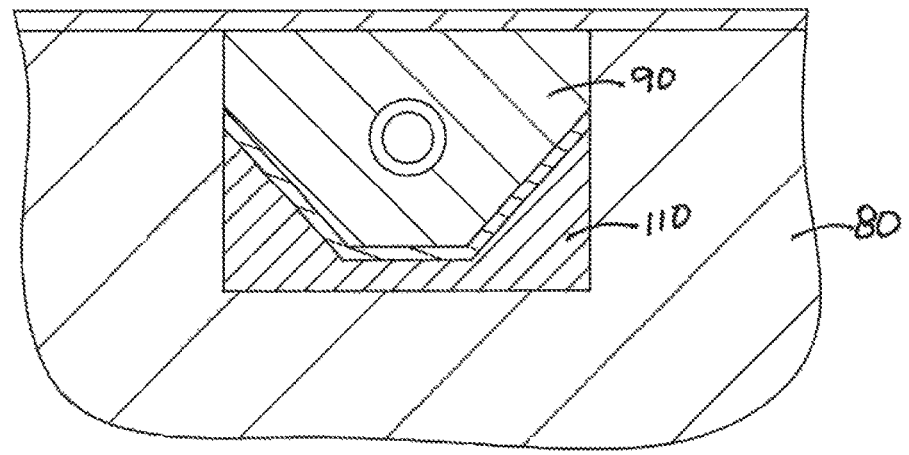

It is important to note that in regard to each of the implementations disclosed or contemplated herein, the walls of the groove may be formed to have essentially the same cross-sectional shape as that of the fiber support 90. Such a construction can result in the forces applied to the fiber support 90 being more uniformly distributed to the inner walls of the groove located in the substrate 80. According to other implementations the space 100 may be occupied by an epoxy, adhesive or other like substances that can assist in supporting the fiber support 90 inside the groove and also in retaining/fixing the fiber support 90 inside the groove. Alternatively, as shown in FIG. 6B, the bottom and side surfaces 95 and 97 of the fiber support 90 may rest on the external surfaces of a cradle 110 that is located in the bottom portion of the groove. The cradle 110 extends along at least a portion of the length or the entire length of the fiber support 90. The cradle may be fixed inside the groove by use of an adhesive or may simply rest inside the groove. In instances where a cradle is used, the exterior surfaces of the cradle that face and abut the outer surfaces 95, 97 of the fiber support may be equipped with a reflector like those described above.

Figure 7:
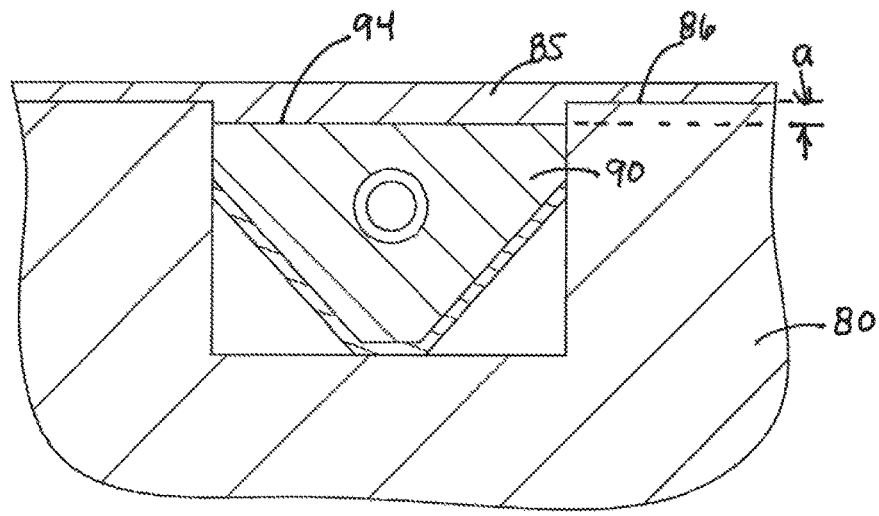

The implementation of FIG. 7 is similar to the implementations of FIGS. 6A and 6B with the exception that the top surface 94 of the fiber support 90 is located a distance "a" below the top surface 86 of the substrate 80 in a manner like that discussed in detail above in conjunction with the implementations of FIGS. 5C through 5F.

Figure 15:
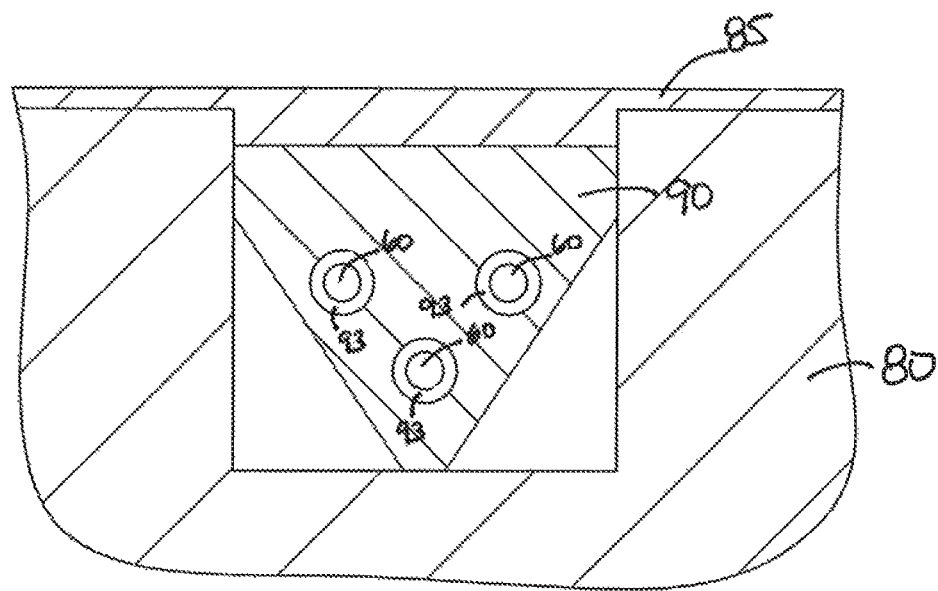
FIGS. 15 and 16 illustrate cross-section views of a light diffusing optical fiber disposed in a floor according to other implementations.

Although the figures associated with the foregoing triangular-like implementations show the use of a single fiber 60, it is appreciated that these same implementations may employ the use of multiple fibers like that shown in FIG. 15. FIG. 15 illustrates an example with there being three fibers 60 positioned inside the groove of the substrate 80, the fibers being supported inside the groove by a fiber support 90 that possess three elongate apertures 93 that house the fibers.

Figure 16:
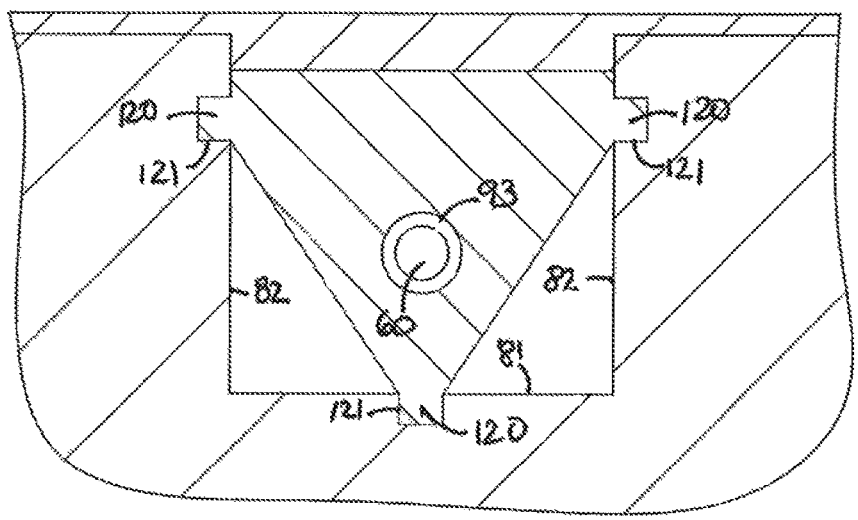
Figure 17:
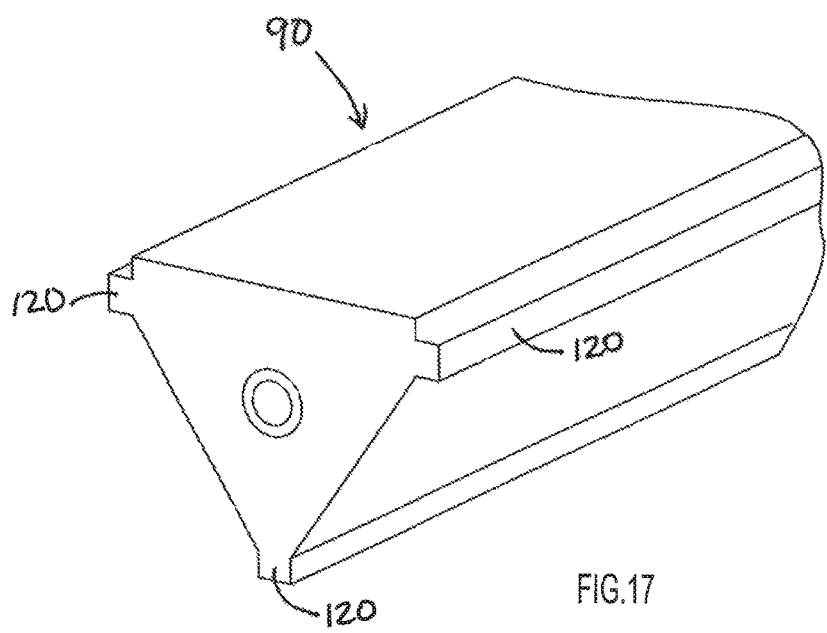
FIG. 17 illustrates a perspective view of the fiber support element of FIG. 16.

As discussed above, some methods for fixing the fiber support 90 inside the groove of the substrate 80 involve the use of an epoxy, adhesive and other like materials. FIG. 16 illustrates yet another method for fixing the fiber support 90 inside the groove. This method may be applied to each of the implementations disclosed and contemplated herein and involves the use of one or more tabs 120 protruding from the fiber support 90 that are fitted into one or more respective notches 121 provided in the walls that define the groove. Conversely, the fiber support 90 may comprise one or more notches that respectively receive tabs that protrude from the wall(s) of the groove. In the implementation of FIG. 16 the fiber support includes two side tabs and one bottom tab that are fitted into respective notches formed in the bottom wall and sidewalls 81, 82 of the groove. FIG. 17 is a perspective view of the fiber support 90 illustrated in FIG. 16.

Figure 8:
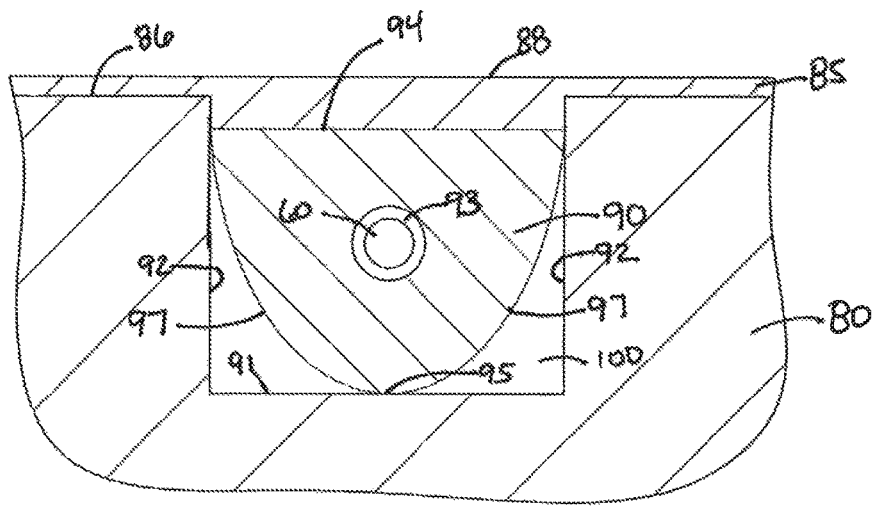

FIGS. 8-14 illustrate various implementation wherein which the fiber support 90 comprises a parabolic-like cross-section. In the implementation of FIG. 8 a parabolic-like shaped fiber support 90 is provided with an aperture 93 that runs at least a portion of the length or the entire length of the support. The fiber 60 may be supported inside the aperture 93 in a removable or fixed fashion like that discussed above, although FIG. 8 coincides with the fiber being removable by virtue of it having a smaller cross-sectional area/diameter than that of the aperture 93. Like the implementations of FIGS. 5A and 5B, the top surface 94 of the fiber support resides in the same or substantially same plane as that of the top surface 86 of the substrate 80. The fiber support includes a curved base 95 from which two curved side surfaces 97 extend upward. The base 95 may also be flat to enhance the stability of the support 90 inside the groove. According to some implementations the base 95 and side surfaces 97 include a reflector 99 that is configured to reflect light emitted from the bottom and side surfaces of the fiber 60 upward toward the top surface 88 of the top coat 95 that is applied to the top surface 86 of the substrate 80. The reflector 99 may comprise a light reflective paint, another type of light reflective coating or a reflective substrate like those described above.

Figure 9:
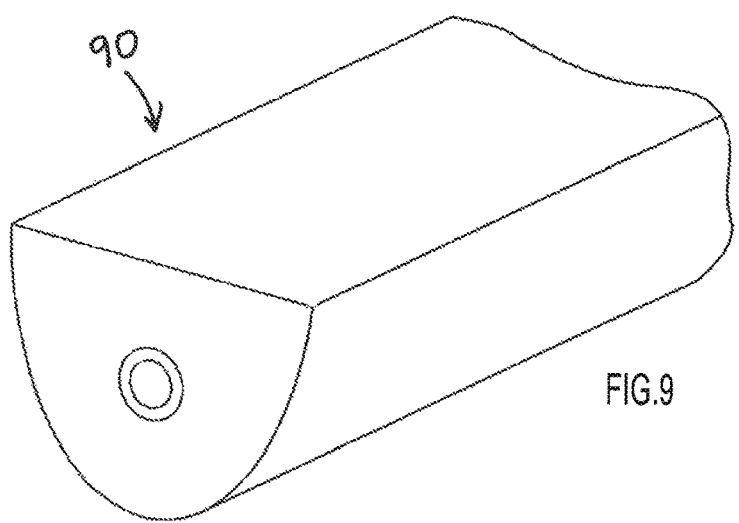
FIGS. 9-11 illustrate perspective views of various exemplary implementations of the fiber support of FIG. 8.
Figure 10:
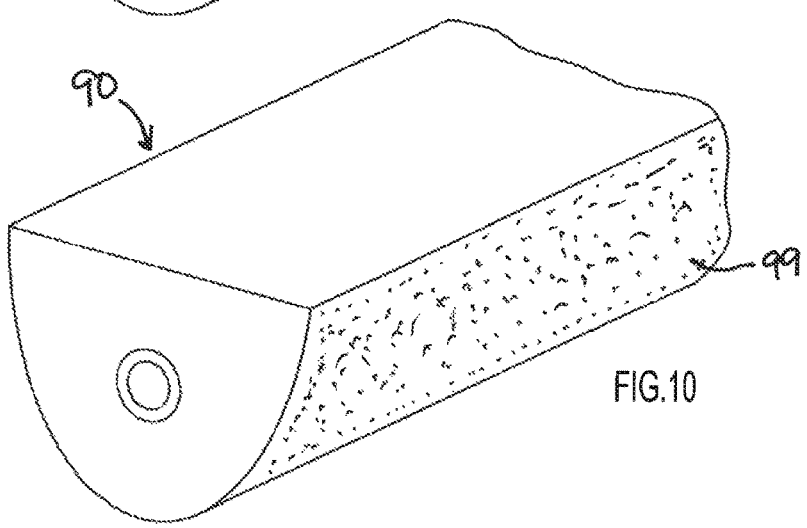
Figure 11:
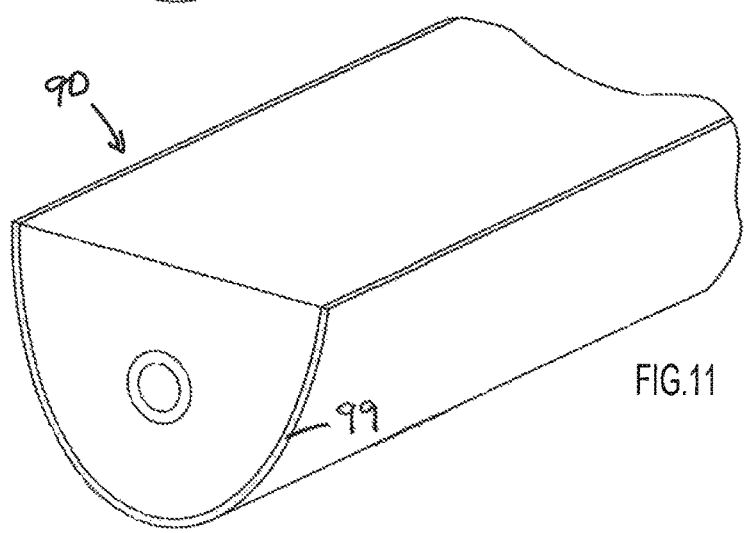

FIGS. 9-11 show perspective views of the various types of parabolic-like fiber supports. In the implementation of FIG. 9 the fiber support is devoid of a light reflective surface. In such an embodiment the bottom wall 91 and sidewalls 92 of groove may instead possess light reflective surfaces. In the implementation of FIG. 10 the outer bottom surface 95 and the side surfaces 97 of the fiber support 90 are provided with a reflector 99 in the form of a light reflective paint or other type of light reflective coating. In the implementation of FIG. 11 the reflector 99 is a parabolic-like shaped reflective substrate that is fitted to the bottom and side surfaces of the fiber support 90.

To secure the parabolic-like fiber support 90 inside the groove of the substrate 80, an epoxy, adhesive or like material may be introduced into the groove prior to the placement of the fiber support. The amount of epoxy/adhesive dispensed into the groove may be an amount sufficient to occupy the space 100 located between the outer surfaces 95, 97 of the fiber support 90 and the walls 91, 92 of the groove. Alternatively, a cradle like that described above in conjunction with the implementation of FIG. 6B may be used to provide a secure footing for the parabolic-like shaped fiber support 90 inside the groove. The shape of the cradle will differ from that of FIG. 6B in that it will comprise an outer surface that conforms to the curvature of the fiber support. In instances where a cradle is used, the exterior surfaces of the cradle that face and abut the curved outer surfaces of the fiber support may be equipped with a reflector like those described above.

With continued reference to FIG. 8, according to some implementations the space 100 is devoid of any structure. According to some implementation the diagonally side walls 97 of the fiber support 90 are capable of flexing outward into the space 100 when the fiber support is subjected to stress. This ability to flex can assist in preventing the formation of cracks in the fiber support 90 when the support is physically stressed, for example, by pressure being applied to its top surface 94 or by a thermal expansion or contraction of one or more of the substrate 80 and support 90.

Figure 12:
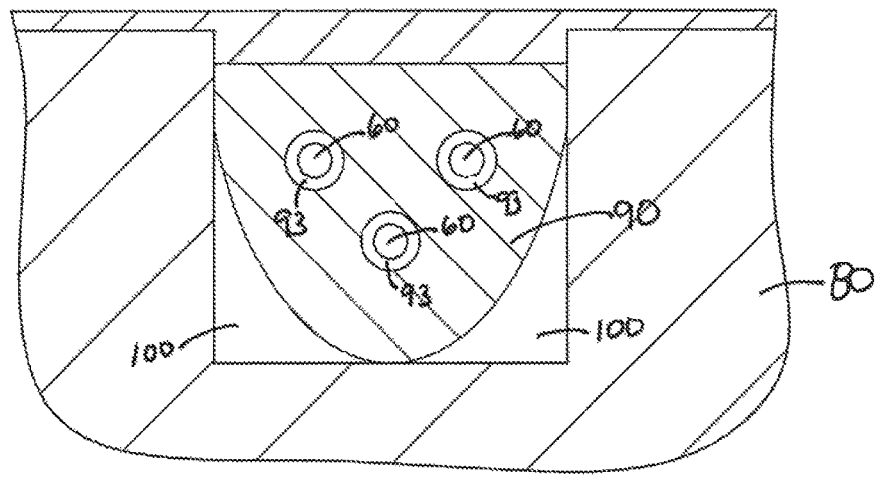
FIGS. 12 and 13 illustrate cross-section views of a light diffusing optical fiber disposed in a floor according to other implementations.

Although the figures associated with the foregoing parabolic-like implementations show the use of a single fiber 60, it is appreciated that these same implementations may employ the use of multiple fibers like that shown in FIG. 12. FIG. 12 illustrates an example with there being three fibers 60 positioned inside the groove of the substrate 80, the fibers being supported inside the groove by a fiber support 90 that possess three elongate apertures 93 that house the fibers.

Figure 13:
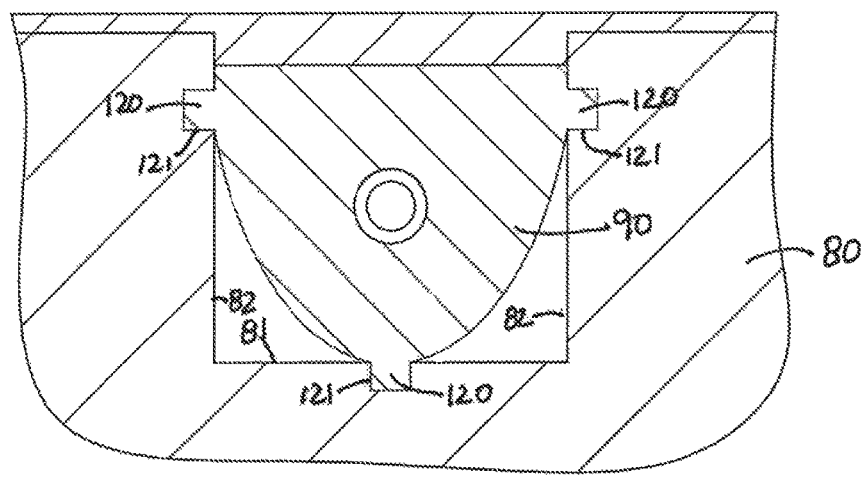
Figure 14:
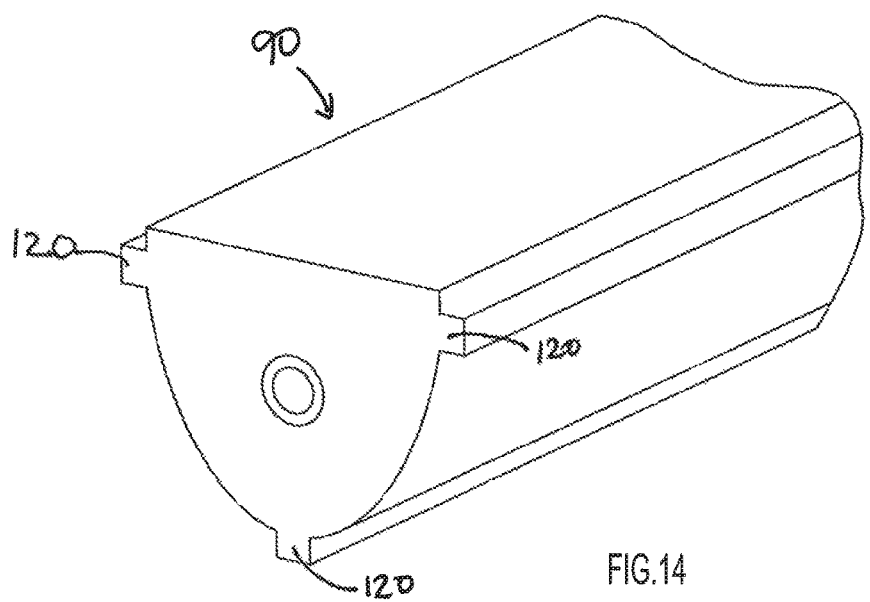
FIG. 14 illustrates a perspective view of the fiber support element of FIG. 13.

As discussed above, some methods for fixing the fiber support 90 inside the groove of the substrate 80 involve the use of an epoxy, adhesive and other like materials. FIG. 13 illustrates yet another method for fixing the fiber support 90 inside the groove that involves the use of one or more tabs 120 protruding from the fiber support 90 that are fitted into one or more respective notches 121 provided in the walls that define the groove. Conversely, the fiber support 90 may comprise one or more notches that respectively receive tabs that protrude from the wall(s) of the groove. In the implementation of FIG. 13 the fiber support includes two side tabs and one bottom tab that are fitted into respective notches formed in the bottom wall and sidewalls 81, 82 of the groove. FIG. 14 is a perspective view of the fiber support 90 illustrated in FIG. 16.

As mentioned briefly above, the fiber support may take on any of a variety of cross-sectional shapes. For example, fiber supports having a semicircular cross-sectional profile or other profiles may also be used consistent with the various examples disclosed herein.

Figure 18:
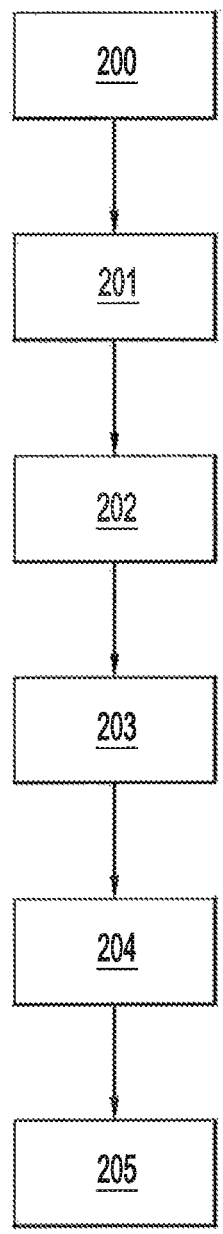
FIGS. 18-21 illustrate flow charts of methods for constructing a lighting system inside a substrate, such as a substrate of a floor.

FIG. 18 is a flow chart that outlines a method for constructing a lighting system inside the substrate of a floor. The steps need not take place in the order described. In step 200 an elongate groove is formed along a length of the substrate. In step 201 one or more exposed walls of the groove are coated with a light reflective film. In step 202 an elongate lighting means, such as a light diffusing optical fiber, is positioned inside an aperture that runs at least a portion of the length of a fiber support. In step 204 the fiber support is placed inside the groove so a top surface of the fiber support resides along substantially the same plane as the top surface of the substrate or resides a distance below the top surface of the substrate. In step 205, a protective top coat is applied over the top surface of the substrate and the top surface of the fiber support in a manner that results in the top surface of the top coat being substantially planar. According to some implementations wherein the lighting means is a light diffusing optical fiber, a laser source is optically connected to the fiber at one or both ends of the fiber.

Figure 19:
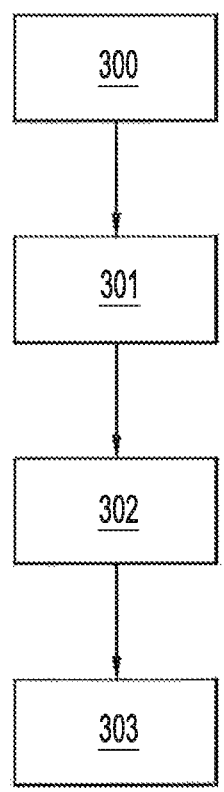

FIG. 19 is a flow chart that outlines a method for constructing a lighting system inside the substrate of a floor. The steps need not take place in the order described. In step 300 an elongate groove is formed along a length of the substrate. In step 301 an elongate lighting means, such as a light diffusing optical fiber, is positioned inside an aperture that runs at least a portion of the length of a fiber support, the fiber support having one or more outer surfaces that are coated with a light reflective film, such as, for example, a light reflective paint. In step 302 the fiber support is placed inside the groove so a top surface of the fiber support resides along substantially the same plane as the top surface of the substrate or resides a distance below the top surface of the substrate. In step 303, a protective top coat is applied over the top surface of the substrate and the top surface of the fiber support in a manner that results in the top surface of the top coat being planar. According to some implementations wherein the lighting means is a light diffusing optical fiber, a laser source is optically connected to the fiber at one or both ends of the fiber.

Figure 20:
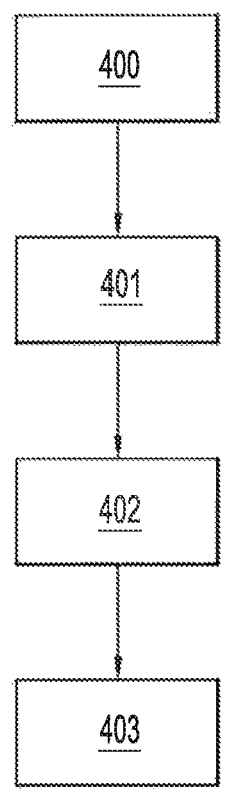

FIG. 20 is a flow chart that outlines a method for constructing a lighting system inside the substrate of a floor. The steps need not take place in the order described. In step 400 an elongate groove is formed along a length of the substrate. In step 401 an elongate lighting means, such as a light diffusing optical fiber, is positioned inside an aperture that runs at least a portion of the length of a fiber support, the fiber support having a reflective substrate located adjacent one or more outer surfaces of the fiber support. The reflective substrate may be affixed to the fiber support or the fiber support may simply rest inside the reflective support. In step 402 the fiber support is placed inside the groove so a top surface of the fiber support resides along substantially the same plane as the top surface of the substrate or resides a distance below the top surface of the substrate. In step 403, a protective top coat is applied over the top surface of the substrate and the top surface of the fiber support in a manner that results in the top surface of the top coat being planar. According to some implementations wherein the lighting means is a light diffusing optical fiber, a laser source is optically connected to the fiber at one or both ends of the fiber.

Figure 21:
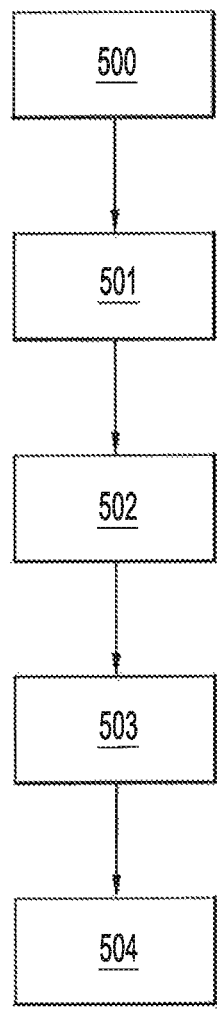

FIG. 21 is a flow chart that outlines a method for constructing a lighting system inside the substrate of a floor. The steps need not take place in the order described. In step 500 an elongate groove is formed along a length of the substrate. In step 501 positioning a cradle inside the groove so that a bottom surface of the cradle is supported by a bottom surface of the groove. In step 502 an elongate lighting means, such as a light diffusing optical fiber, is positioned inside an aperture that runs at least a portion of the length of a fiber support. In step 503 the fiber support is placed inside the groove so that at least a portion of a bottom and side surfaces of the fiber support rest on the cradle, the cradle having one or more light reflective surfaces that abut one or more of the bottom and side surfaces of the fiber support when the fiber support is position on the cradle. The fiber support being configured so that a top surface of the fiber support resides along substantially the same plane as the top surface of the substrate or resides a distance below the top surface of the substrate. In step 504, a protective top coat is applied over the top surface of the substrate and the top surface of the fiber support in a manner that results in the top surface of the top coat being planar. According to some implementations the cradle is affixed to the bottom wall and/or sidewalls of the groove. According to other implementations the cradle simply rests inside the groove without being affixed thereto. According to some implementations wherein the lighting means is a light diffusing optical fiber, a laser source is optically connected to the fiber at one or both ends of the fiber.

According to some implementations the open end of the groove has a width and a centerline that extends orthogonal to the top surface 86 of the substrate 80. A light reflector 99 is located inside the groove and is configured to cause an illumination at the top surface of the substrate (or the top surface 88 of the top coat 85) when the optical fiber emits light, the light reflector configured to cause the illumination as viewed vertically above the centerline to have a width that is greater than the width of the open end of the groove.

According to other implementations the fiber support 90 is at least partially encased in a transparent or translucent material inside the groove. The transparent or translucent material may be the same as the material that forms the top coat 85 on the top surface 86 of the substrate 80.

According to other implementations the fiber support 90 is at least partially encased in a transparent or translucent adhesive inside the groove.

Throughout the foregoing written description the lighting of the floor is disclosed as being provided by a light diffusing optical fiber that is illuminated by a laser source. However, according to other implementations light is provided in the flooring by other means, such as, for example, by a string of LEDs that reside in the apertures 93 of the fiber supports 90. In addition, the foregoing description provides a number of examples for providing lighting within a substrate 80 that forms a part of a floor. It is appreciated, however, that the substrate 80 need not form the part of a floor.

What is claimed is:
1. A floor comprising:
a substrate having a top surface and a groove formed therein, the groove having an open end located at the top surface of the substrate, the groove further including side walls and a bottom wall, the bottom wall located a first distance below the top surface of the substrate, the groove extending along a length of the substrate,
a light diffusing optical fiber supported inside the groove by a transparent or translucent fiber support that spaces the light diffusing optical fiber away from the bottom wall, side walls and open end of the groove,
the top surface of the substrate being covered by a transparent or translucent finish, the transparent or translucent finish covering the open end of the groove,
the fiber support having a top surface, the top surface of the fiber support lying below the top surface of the substrate with there being a gap that exists between the top surface of the fiber support and the top surface of the substrate, the gap being filled with the transparent or translucent finish.
2. The floor according to claim 1, wherein one or more of the bottom wall and sidewalls of the groove are coated with a light reflecting material that causes at least a portion of light emitted by the light diffusing optical fiber to be reflected toward the open end of the groove.

3. The floor according to claim 1, wherein the fiber support is at least partially housed inside a light reflecting structure.

4. The floor according to claim 1, wherein the fiber support has outer surfaces that face toward one or more of the bottom wall and side walls of the groove, at least a portion of the outer surfaces being coated with a light reflecting coating that causes at least a portion of light emitted by the light diffusing optical fiber to be reflected toward the open end of the groove.

5. The floor according to claim 1, wherein the transparent or translucent finish is selected from the group consisting of a urethane and an epoxy.

6. The floor according to claim 1, wherein the open end of the groove has a first width and the bottom of the groove has a second width, the first width being greater than the second width.

7. The floor according to claim 1, wherein the fiber support has a top end having a first width and a bottom end with a second width, the first width being greater than the second width.

8. The floor according to claim 1, wherein the fiber support is made of a polymeric material.

9. The floor according to claim 1, wherein the fiber support is made of glass.

10. The floor according to claim 1, wherein the light diffusing optical fiber is located inside an aperture located inside the fiber support and running at least a portion of a length of the fiber support.

11. The floor according to claim 10, wherein the light diffusing optical fiber is movable within the aperture of the fiber support.

12. The floor according to claim 10, wherein the light diffusing optical fiber is fixed within the aperture of the fiber support.

13. The floor according to claim 10, wherein the aperture is defined by an inner wall and the light diffusing optical fiber comprises an outer jacket having an outer surface, one or both of the inner wall of the aperture and the outer surface of the jacket comprising a lubricous coating.

14. A floor comprising:
a substrate having a top surface and a groove formed therein, the groove having an open end located at the top surface of the substrate, the groove further including side walls and a bottom wall, the bottom wall located a first distance below the top surface of the substrate, the groove extending along a length of the substrate,
a light diffusing optical fiber supported inside the groove by a transparent or translucent fiber support that spaces the light diffusing optical fiber away from the bottom wall, side walls and open end of the groove,
wherein the open end of the groove has a first width and a centerline that extends orthogonal to the width, a light reflector being located inside the groove and configured to cause an illumination at the top surface of the substrate when the optical fiber emits light, the light reflector configured to cause the illumination as viewed vertically above the centerline to have a width that is greater than the width of the open end of the groove.

15. The floor according to claim 3, wherein the fiber support has a parabolic shape.

16. The floor according to claim 4, wherein the fiber support has a parabolic shape.

17. The floor according to claim 3, wherein the fiber support has a triangular shape.

18. The floor according to claim 4, wherein the fiber support has a triangular shape.

19. The floor according to claim 1, wherein the fiber support is at least partially encased in a durable transparent or translucent material inside the groove.

20. The floor according to claim 1, wherein the fiber support is at least partially encased in a transparent or translucent adhesive inside the groove.

* * * * *